United States Patent
Meijer et al.

(10) Patent No.: US 8,973,840 B2
(45) Date of Patent: Mar. 10, 2015

(54) INTEGRATED CIRCUIT

(71) Applicant: NXP B. V., Eindhoven (NL)

(72) Inventors: Rinze Ida Mechtildis Peter Meijer, Herkenbosch (NL); Ghiath Al-kadi, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 13/967,469

(22) Filed: Aug. 15, 2013

(65) Prior Publication Data

US 2014/0049290 A1 Feb. 20, 2014

(30) Foreign Application Priority Data

Aug. 16, 2012 (EP) .................................... 12180684

(51) Int. Cl.
| | |
|---|---|
| *G06K 19/06* | (2006.01) |
| *H03K 5/153* | (2006.01) |
| *G06F 11/30* | (2006.01) |
| *G06F 21/55* | (2013.01) |
| *G06F 21/71* | (2013.01) |

(52) U.S. Cl.
CPC ............ *H03K 5/153* (2013.01); *G06F 11/3024* (2013.01); *G06F 11/3055* (2013.01); *G06F 11/3072* (2013.01); *G06F 21/554* (2013.01); *G06F 21/71* (2013.01)
USPC .......................................... 235/492; 235/375

(58) Field of Classification Search
USPC .................... 235/492, 375, 380, 451
See application file for complete search history.

(56) References Cited

U.S. PATENT DOCUMENTS

| | | | | |
|---|---|---|---|---|
| 5,781,783 | A | * | 7/1998 | Gunther et al. ................ 713/320 |
| 5,852,616 | A | | 12/1998 | Kubinec |
| 6,895,520 | B1 | * | 5/2005 | Altmejd et al. ............... 713/324 |
| 2003/0056154 | A1 | * | 3/2003 | Edwards et al. ................ 714/45 |
| 2007/0018003 | A1 | | 1/2007 | Jeong |
| 2013/0080819 | A1 | * | 3/2013 | Bowling et al. ............... 713/502 |
| 2014/0036306 | A1 | * | 2/2014 | Matsuda ...................... 358/1.15 |

OTHER PUBLICATIONS

Petrescu, Violeta, et al; "Monitors for a Signal Integrity Measurement System"; Proceedings of the Solid-State Circuits Conference; 4 pages (2006).

Tschanz, James; "Adaptive Frequency and Biasing Techniques for Tolerance to Dynamic Temperature—Voltage Variations and Aging"; 2007 IEEE Intl Solid-State Circuits Conference; 3 pages (2007).

Abramovici, Miron et al; "Integrated Circuit Security—New Threats and Solutions"; Proc. Of $5^{th}$ Annual Workshop on Cyber Security and Information Intelligence Research: Cyber Security and Information Intelligence Challenges and Strategies; United States; 4 pages (2009).

Das, Shidhartha, et al; "RazorII: In Situ Error Detection and Correction for PVT and SER Tolerance"; IEEE Journal of Solid-State Circuits, vol. 44, No. 1 (Jan. 2009).

(Continued)

*Primary Examiner* — Edwyn Labaze

(57) ABSTRACT

There is disclosed an integrated circuit comprising a management unit for managing the occurrence of predetermined events in the integrated circuit. The management unit comprises: a processing unit adapted to determine the occurrence of a predetermined event in the integrated circuit; a data storage unit adapted to store information regarding the determined event occurrence; an output interface adapted to output a signal based on the stored information regarding the determined event occurrence; and an output generating unit adapted to analize the stored information and to generate a signal to be output by the output interface based on results of the analysis.

14 Claims, 4 Drawing Sheets

(56) References Cited

OTHER PUBLICATIONS

Carter, Nicholas P., et al; "Design Techniques for Cross-Layer Resilience"; Design, Automation & Test in Europe Conference & Exhibition (DATE); 6 pages (Mar. 8-12, 2010).

Narasimhan, Seetharam, et al; "Improving IC Security against Trojan Attacks through Integration of Security Monitors"; IEEE Design and Test of Computers; 10 pages (Jan. 1, 2012).

Extended European Search Report for Application 12180684.8 (Nov. 7, 2012).

\* cited by examiner

INTEGRATED CIRCUIT

CROSS-REFERENCE TO RELATED APPLICATIONS

This application claims the priority under 35 U.S.C. §119 of European patent application no. 12180684.8, filed on Aug. 16, 2012, the contents of which are incorporated by reference herein.

This invention relates to the field of integrated circuits, and in particular to management of events in an integrated circuit.

With the persistent scaling of CMOS technology. Integrated Circuits (ICs) are becoming more susceptible to variation induced effects, such as process variability, transistor wear-out mechanisms (such as aging), power integrity, and tampering events.

Traditional IC design approaches are typically based on the inclusion of (safety) margins to account for or counteract variation influences. This is costly in terms of the increased silicon area requirements, power overhead and speed loss.

Accordingly, efforts have been made to design variation resilient ICs, and it is known to equip an IC with runtime adaptive feedback control in an attempt to provide more resilient operation.

Depending on the variation induced effect (e.g. a change in circuit parameter) to be catered for, feedback control solutions may be fully implemented in hardware, or may be implemented as a mixed hardware-software solution. Fully-hardware based control solutions are typically preferred. They offer the good control speed (or reaction time), can operate autonomously (i.e. without requiring user interaction), and can deal with a wide variety of variation induced effects. However, on the downside, fully-hardware based control solutions are not flexible to changing control parameters. In other words, when something needs to be adjusted, it is hard to do so in fully-hardware based solutions.

Mixed hardware-software control solutions are known and can trade-off control speed for flexibility. Like fully-hardware based control solutions, mixed hardware/software control solutions may not require user interaction. Typically, mixed hardware/software solutions are more flexible than fully-hardware solutions, but the reaction time of mixed hardware/software is slower than fully-hardware solutions.

For ICs that utilize runtime adaptive feedback control, the user or software lacks insight about the variation induced effects and loop operation. For example, the user or software may not be able to answer the following questions: Which variation induced effect has occurred? Did it cause a soft-error? How many times did it occur? Where did it occur? Did it result in a security critical issue (in case of chip tampering events)? Is the control loop operating at its control limits? Has the useful life-span of the IC been affected? What is the estimated life-span of the IC as a result? etc.

According to the invention, there is provided an integrated circuit according to the independent claim.

It is proposed to employ a circuit management unit as part of an IC which monitors the occurrence of events in the IC and collects information about event occurrences. Thus, the management unit may gather relevant information about occurred events, may provide state-of-health information (i.e. an indication of the value(s) of important circuit parameters) to a user or software, and may interrupt operation of the IC in the case of a critical event taking place. Making available such state of health information may be useful for understanding a remaining useful lifespan of the IC, for example.

Embodiments may therefore provide a variation resilient IC that exhibits robust and secure operation. Furthermore, such embodiments may not degrade the operational performance of the IC.

The management unit may comprise an input interface adapted to receive a request for information. The management unit may then be adapted to output a response to a received request for information based on information stored in the data storage unit Examples of the invention will now be described in detail with reference to the accompanying drawings, in which.

In the remainder of this description, a variation induced effect, such as a change in a circuit parameter or circuit property, will be referred to as an event.

There is a proposed the use of an event monitoring or management unit in an IC. Such a management unit may store information relating to event occurrences. It may also determine information indicating a circuit parameter or property, which may in turn provide an indication of the state-of-health of the IC, such as an estimate of the remaining IC lifetime for example. The management unit may also interrupt operation of the IC in the case of one or more critical events taking place, such as a tampering attempt.

Figure 1:
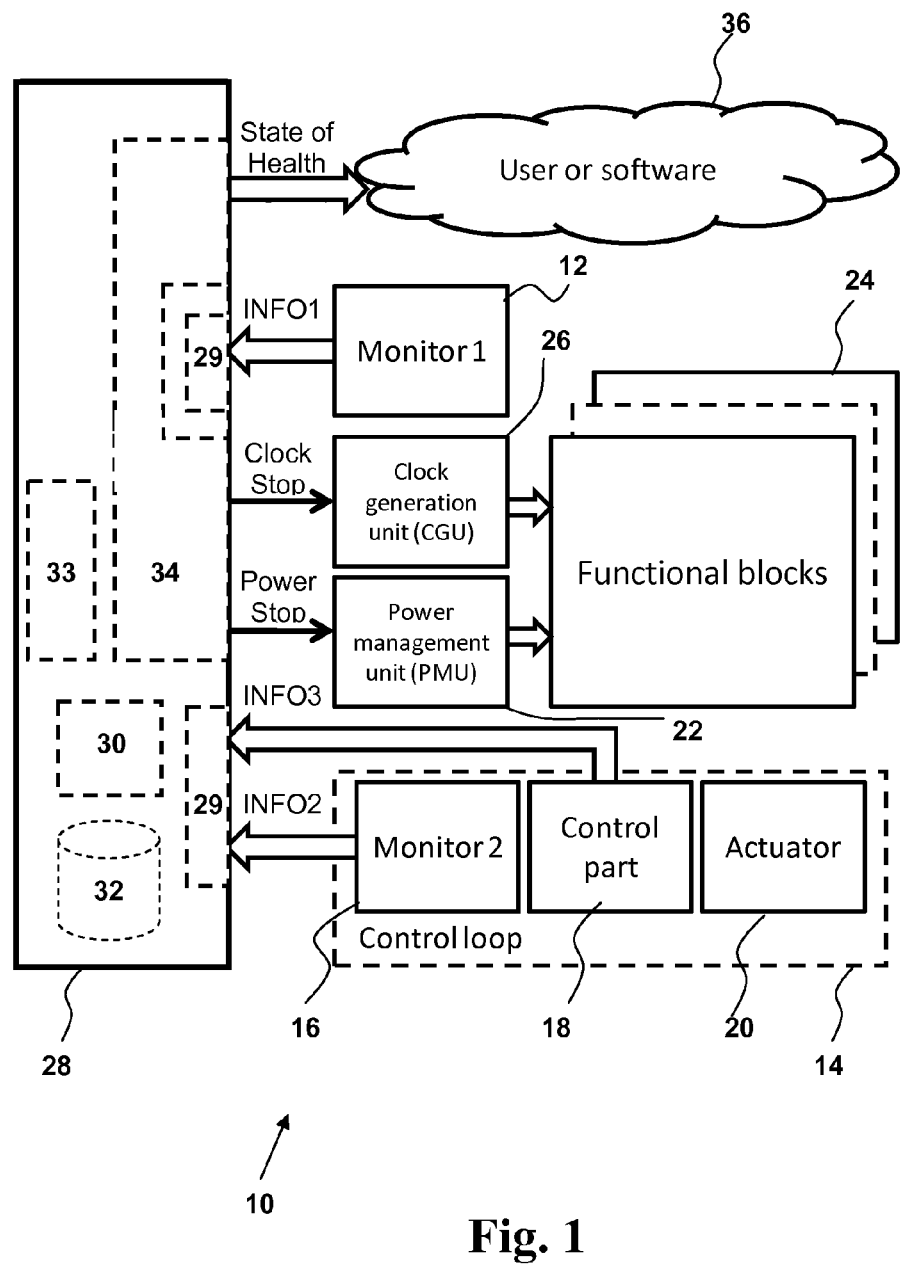
FIG. 1 shows a simplified block diagram of an IC according to an embodiment of the invention.

FIG. 1 is a simplified block diagram of an IC 10 according to an embodiment of the invention. In this example, the IC 10 comprises a first monitor 12 (Monitor1) of a first circuit parameter and a control loop 14. The control loop 14 comprises a second monitor 16 (Monitor2) of a second circuit parameter, a control part 18 and an actuator block 20.

The IC 10 also comprises a power management unit (PMU) 22 for controlling a power supplied to the functional blocks 24 of the IC 10, and also comprises a clock generation unit (CGU) 26 for generating and supplying one or more clock signals to the functional blocks of the IC 10.

Although not shown in this example, the actuator 20 of the control loop could also be the PMU 22 (in case of dynamic voltage scaling), the CGU 26 (in case of dynamic frequency scaling), or both the PMU and CGU (in case of dynamic voltage and frequency scaling).

The IC 10 further comprises a management unit (MU) 28 that is adapted to receive, via an input interface 29, information (INFO1, INFO2) from the first 12 and second 16 monitors (Monitor1. Monitor2) and information (INFO3) from the control part 18 of the control loop 14. Thus, the information received by the MU 28 relates to values of monitored circuit parameters and thus identifies if a predetermined circuit event has occurred.

Using the received information (INFO1, INFO2), the processing unit 30 of the MU 28 determines the occurrence of a predetermined event in the IC 10. Information regarding the determined event is then stored in a data storage unit 32 of the MU 28. Accordingly, the MU 28 is adapted to register information regarding the occurrence of predetermined events at each of the first 12 and second 16 monitors, and can therefore determine the number and/or regularity of event occurrences for each monitor. In this way, the MU 28 stores information about a predetermined event occurrence, where it took place, how often it took place, and when it took place.

The MU 28 is adapted to analyse the stored information to determine whether or not event occurrences are within a predetermined acceptable range. If they are determined not to be (e.g. the regularity of event occurrence exceeds a predetermined acceptable threshold value), the MU 28 outputs a signal via its output interface 34 to stop or interrupt operation of the IC 10, or to change the operating mode or condition of the IC 10. Such a signal may be a Clock Stop signal that is provided to the CGU 26 and causes the CGU 26 to cease generation/provision of one or more clock signals to one or more functional blocks 24 of the IC 10. Alternatively, such a signal may be a Power Stop signal that is provided to the PMU 22 and causes the PMU 22 to cease generation/provision of one or more power supplies to one or more functional blocks 24 of the IC 10.

The MU 28 may also output a State of Health (SoH) signal (via the output interface 34) to a user or software 36 of the IC 10 which reports that event occurrences are not within the predetermined acceptable range. Such a SoH signal may provide relevant information about the event occurrence(s), such as its location, count, regularity, associated circuit parameter value(s), etc. Based on this SoH signal, the user or software 36 may determine a preferred course of action for the IC 10.

Figure 2:
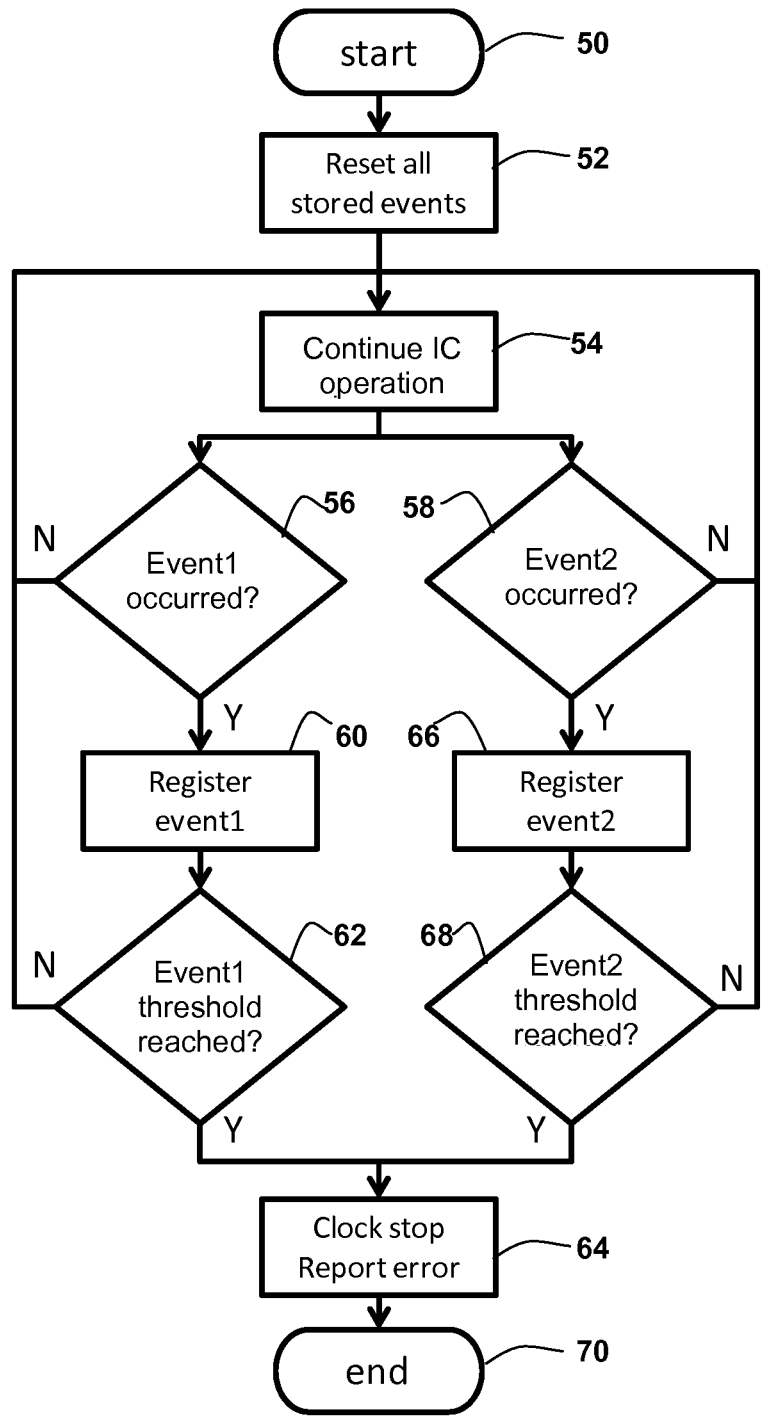
FIG. 2 shows a flow diagram of a method of managing the occurrence of events in an IC according to an embodiment of the invention.

Referring to FIG. 2, there is shown a flow diagram of an exemplary method of managing the occurrence of events in an IC according to an embodiment (such as that shown in FIG. 1). In this example, as long as the number of occurrences of a predetermined event remains below an acceptable threshold value, the IC keeps being clocked. Otherwise, when the number of occurrences of the predetermined event exceeds the acceptable threshold value, the clock signal for the IC is stopped and an error is reported to the user or software.

The method starts at step 50 and proceeds to step 52 in which stored information regarding the occurrence of predetermined events is reset (e.g. cleared, deleted or set to a default value). The method then proceeds to step 54 in which operation of the IC continues. Next, in steps 56 and 58, the operation of the IC is monitored for the occurrence of first (Event 1) and second (Event2) events, respectively. If neither of the first or second events occurs, the method loops back to step 54 wherein the IC continues operating and management for the occurrence of the first or second events is again undertaken in steps 56 and 58, respectively.

If, in step 56, the occurrence of the first event Event1 is determined to have taken place (for example, through detection at a first monitor 12 Monitor1), the method proceeds to step 60 in which the occurrence of the first event Event 1 is registered. In particular, information regarding the detected occurrence of the first event Event 1 is stored in a database of a management unit according to an embodiment of the invention. Such event information may comprise data representing detail of the event occurrence such as time of occurrence, location of occurrence, circuit parameter values and the like.

After completing step 60, the method proceeds to step 62 in which the number of registered occurrences of the first event Event 1 is determined and checked against a predetermined acceptable threshold value. If the registered number of occurrences of the first event Event1 is less than the predetermined acceptable threshold value, the method loops back to step 54 wherein the IC continues operating and monitoring for the occurrence of the first or second events is again undertaken in steps 56 and 58, respectively. If, on the other hand, the registered number of occurrences of the first event Event 1 is equal to or exceeds the predetermined acceptable threshold value, the method continues to step 64 in which the clock signal for the IC is stopped and an error is reported to the user or software.

A similar method flow if followed from step 58. Specifically, if, in step 58, the occurrence of the second event Event2 is determined to have taken place (for example, through detection at a second monitor 16 Monitor2), the method proceeds to step 66 in which the occurrence of the second event Event2 is registered. Like in step 60, step 66 comprises storing information regarding the detected occurrence of the second event Event2 in a database of a management unit according to an embodiment of the invention. After completing step 66, the method proceeds to step 68 in which the number of registered occurrences of the second event Event2 is determined and checked against a predetermined acceptable threshold value. If the registered number of occurrences of the second event Event2 is less than the predetermined acceptable threshold value for the second event Event2, the method loops back to step 54 wherein the IC continues operating and monitoring for the occurrence of the first or second events is again undertaken in steps 56 and 58, respectively. If, on the other hand, the registered number of occurrences of the second event Event2 is equal to or exceeds the predetermined acceptable threshold value for the second event Event2, the method continues to step 64 in which the clock signal for the IC is stopped and an error is reported to the user or software.

The method then ends in step 70.

Figure 3:
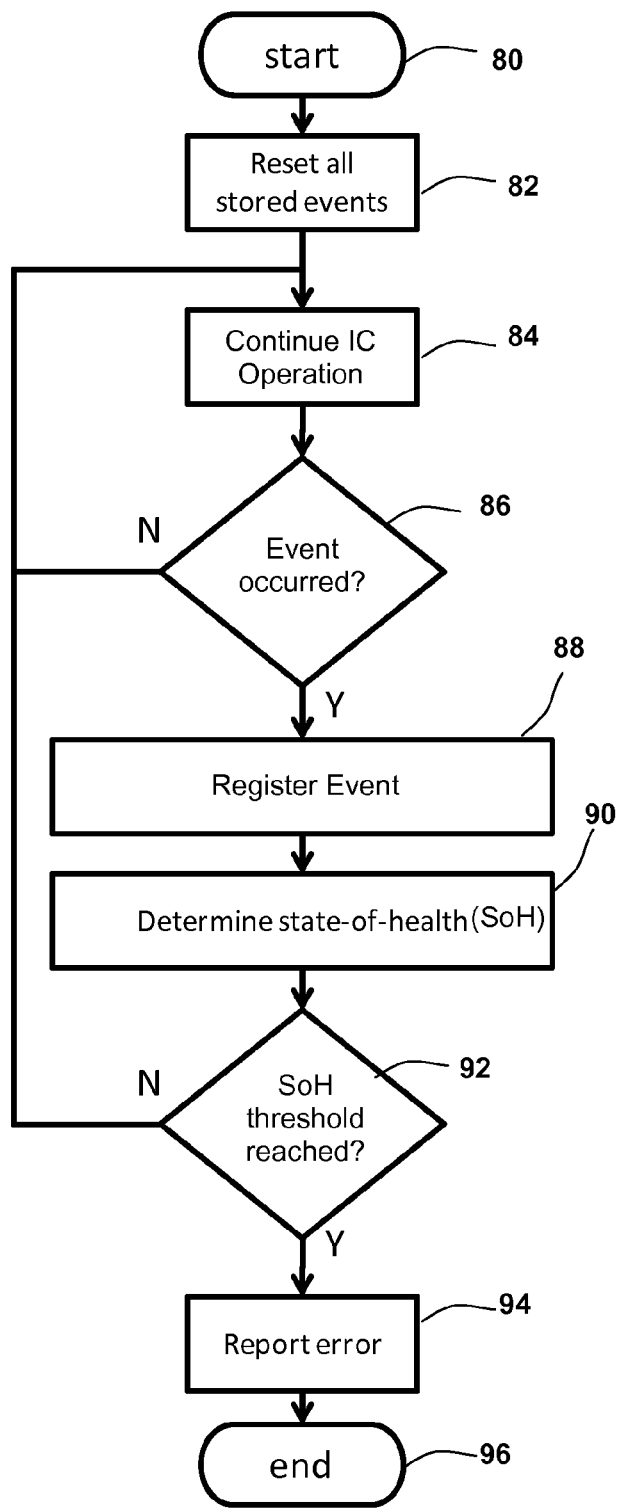
FIG. 3 shows a flow diagram of a method of managing the occurrence of events in an IC according to another embodiment of the invention.

Referring to FIG. 3, there is shown a flow diagram of another exemplary method of managing the occurrence of events in an IC according to an embodiment (such as that shown in FIG. 1). In this example, the occurrence of a predetermined event is used to determine an indicator of the State of Health (SoH) of the IC, and if the SoH value exceeds an acceptable threshold value, an error is reported to the user or software. ICs are susceptible to component deterioration, or in other words. ICs experience aging. Providing SoH information to user or software can be helpful for ensuring reliable circuit operation over the IC life time.

The method starts at step 80 and proceeds to step 82 in which stored information regarding the occurrence of predetermined events is reset (e.g. cleared, deleted or set to a default value). The method then proceeds to step 84 in which operation of the IC continues. Next, in step 86, the operation of the IC is monitored for the occurrence of a predetermined event. If the predetermined event does not occur, the method loops back to step 84 wherein the IC continues operating and monitoring for the occurrence of the predetermined event is again undertaken in step 86.

If, in step 86, the occurrence of the predetermined event is determined to have taken place (for example, through detection at a monitor in the IC), the method proceeds to step 88 in which the occurrence of the event is registered. Here, information regarding the detected occurrence of the event is stored in a database of a management unit according to an embodiment of the invention. The event information may comprise data representing details of the event occurrence such as time of occurrence, location of occurrence, detected circuit parameter values, calculated/estimated/predicted circuit parameter values, monitor values and the like.

After completing step 88, the method proceeds to step 90 in which an operating state of the IC or one or more of its components is determined and checked against a predetermined acceptable value. If the determined state meets the requirements of the predetermined acceptable value (e.g. has a value within an acceptable range, or equals an acceptable state), the method loops back to step 84 wherein the IC continues operating and monitoring for the occurrence of the predetermined event is again undertaken in step 86. If, on the other hand, the determined state does not meet the requirements of the predetermined acceptable value (e.g. has a value outside of an unacceptable range, or does not equal an acceptable state), the method continues to step 94 in which an error is reported to the user or software as an error signal. In addition to the indication of an error in the IC, the error signal also comprises information relating to the determined operating state of the IC (such as some or all of the stored event information).

The method then ends in step 96.

It will be appreciated that the above example of FIG. 3 demonstrates how an embodiment of the invention can be employed to acquire information regarding how much of a circuit parameter range is utilized and/or whether the value of a circuit parameter has reached or surpassed an acceptable limit. For example, an embodiment may be used to check if body bias control range is at its limits, or the VDD control range is at its limits. Such information may be important for runtime adaptive control solutions, like a case for compensating transistor aging effects. When a parameter value if at an unacceptable limit for example, no more compensation may be possible which can the result in end of life of the IC, It will also be understood that the acceptable limits may be altered (automatically or by a user) according to requirements.

By registering occurrences of the parameter exceeding a predetermined acceptable value, the user or software can be warned of such an unacceptable event taking place and thus indicated that a component of the IC is nearing the end of its lifespan. In other words, embodiments can use information regarding the occurrence of events in an IC to determine state-of-health information of the IC which can be provided to the user or software.

Figure 4:
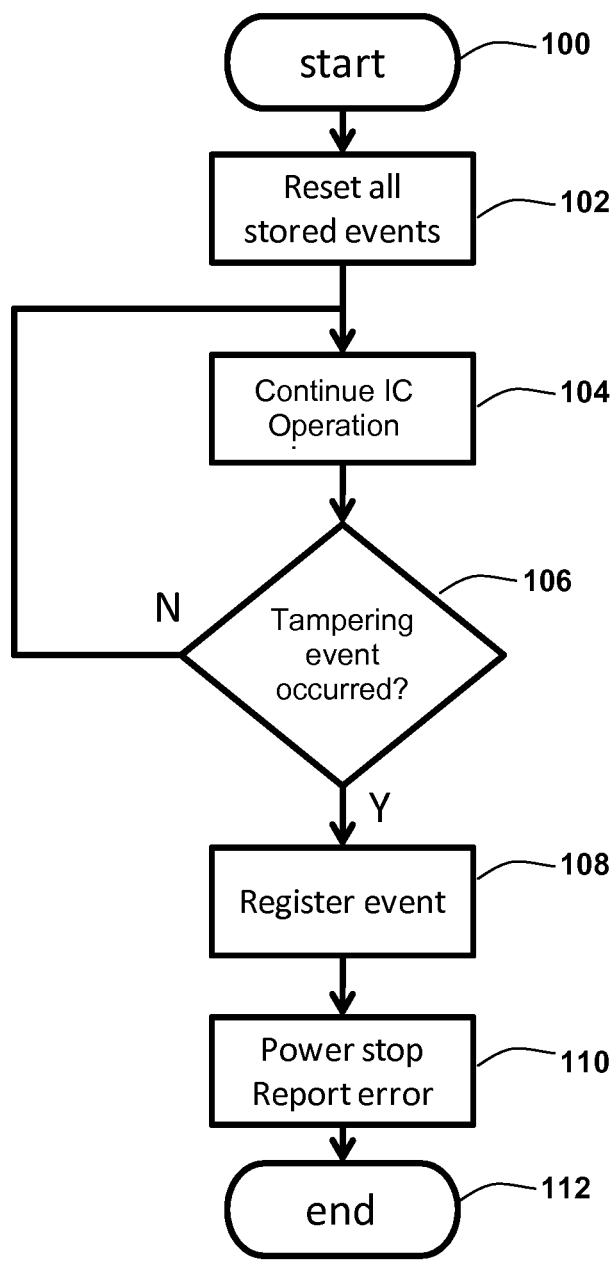
FIG. 4 shows a flow diagram of a method of managing the occurrence of events in an IC according to yet another embodiment of the invention.

Referring to FIG. 4, there is shown a flow diagram of another exemplary method of managing the occurrence of events in an IC according to an embodiment (such as that shown in FIG. 1). In this example, the occurrence of a tampering event is determined, the power supply to the IC stopped, and the tampering event reported to the user or software. Tampering events can threaten reliable IC operation by breaching chip security, for example. To detect if the IC is being tampered, the IC can be equipped with tampering sensors like light-sensors for detecting light. Such tampering sensors can be connected to a management unit according to an embodiment of the invention so that the management unit can collect information indicating if the IC is being tampered with. Further information regarding a tampering event (such as the time, location and tampered component/portion of the IC) may also be obtainable through the use of appropriately arranged sensors. Using such information, the management unit can determine potential countermeasures against the detected tampering events.

The method of FIG. 4 starts at step 100 and proceeds to step 102 in which stored information regarding the occurrence of predetermined events is reset (e.g. cleared, deleted or set to a default value). The method then proceeds to step 104 in which operation of the IC continues. Next, in step 106, the operation of the IC is monitored for the occurrence of a tampering event (as detected by an appropriately arranged sensor of the IC, or by implication from detected parameter values of the IC). If a tampering event does not occur, the method loops back to step 104, wherein the IC continues operating and monitoring for the occurrence of the predetermined event is again undertaken in step 106.

If, in step 106, the occurrence of a tampering event is determined to have taken place (for example, through detection at a sensor of the IC), the method proceeds to step 108 in which the occurrence of the tampering event is registered. Here, information regarding the detected occurrence of the tampering event is stored in a database of a management unit according to an embodiment of the invention. The tampering event information may comprise data representing details of the tampering event occurrence such as time of occurrence, location of occurrence, circuit parameter values, error correction values, error correction frequency, and the like. After completing step 108, the method proceeds to step 110 in which the power supply to the IC is stopped and the tampering event is reported to the user or software. When reporting the tampering event to the user of software, the reporting signal comprises information relating to the detected tampering event (such as some or all of the stored tampering event information).

Alternatively, different embodiments may interrupt IC operation by stopping a clock signal provided to the IC (instead of the stopping the power supply).

From the above-described embodiments, it will be understood that embodiments of provide variation resilient ICs that can exhibit robust and secure operation. Run-time event handling can be provided which enables action to taken in order to deal with or counteract events due to variation influences or IC tampering attempts. Further, embodiments can provide an insight into event occurrences by providing detailed information regarding the events. Such information can be reported to a user of software of the IC and indicate a SoH of the IC.

Alternative embodiments can also be implemented. For example, other embodiments may employ one or more dedicated monitoring units for monitoring the occurrence of a particular event. Conversely, a single monitoring unit may be employed for the purpose of monitoring the occurrence of a plurality of different events. Also, the processing unit may perform some or all of the functions of the output generating unit. In other words, the output generating unit may be implemented using the processing unit.

The event management unit may also be adapted to re-configure the IC to operate in a different state or may set different operating conditions. For example, as the IC ages, its performance gets degraded. This performance degradation may be compensated for by the management unit changing operating conditions like increasing the VDD to compensate for the performance loss, or to apply (more) forward body bias to compensate for the performance loss. Also, the management unit may make use of redundant hardware to execute certain tasks such that the IC can finish a task within the required time. In other words, the management unit could make use of parallel processing within the IC when necessary.

The proposed management unit may therefore provide the following functionality: i) changing of operating conditions; and ii) re-configuration of the usage of on-chip building blocks (e.g. making use of redundant resources).

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. An integrated circuit comprising a management unit for managing the occurrence of predetermined events in the integrated circuit, wherein the management unit comprises:

a processing unit adapted to determine the occurrence of a predetermined event in the integrated circuit;

a data storage unit adapted to store information regarding the determined event occurrence;

an output interface adapted to output a signal based on the stored information regarding the determined event occurrence; and an output generating unit adapted to analyse the stored information and to generate a signal to be output by the output interface based on results of the analysis.

2. The integrated circuit of claim 1, wherein the management unit further comprises an input interface adapted to receive a signal from the integrated circuit and to pass the received signal to the processing unit.

3. The integrated circuit of claim 2, wherein the output generating unit is adapted to determine a number of occurrences of a predetermined event and to generate the signal to be output if the determined number of occurrences of the predetermined event exceeds a predetermined threshold value.

4. The of integrated circuit of claim 2, wherein the output generating unit is adapted to determine an operating state of the integrated circuit and to generate the signal to be output if the determined operating state equals a predetermined state value.

5. The integrated circuit of claim 4, wherein the generated signal to be output comprises information relating to the determined operating state of the integrated circuit.

6. The integrated circuit of claim 2, wherein the generated signal to be output comprises a stop signal for stopping operation of integrated circuit.

7. The integrated circuit of claim 2, wherein the generated signal to be output comprises a signal for changing an operating condition of the integrated circuit.

8. The integrated circuit of claim 2, wherein the generated signal to be an output comprises a signal for reconfiguring functional blocks of the integrated circuit.

9. The integrated circuit of claim 1, wherein the signal to be output by the output interface comprises information regarding at least one occurrence of the predetermined event.

10. The integrated circuit of claim 1, wherein the input interface is further adapted to receive a request for information;

and wherein the management unit is adapted to output, via the output interface, a response to a received request for information based on information stored in the data storage unit.

11. The integrated circuit of claim 10, wherein the response to a received request for information comprises information stored in the data storage unit.

12. A method of managing the occurrence of events in an integrated circuit comprising a management unit, the method comprising the steps of:

determining, in the monitoring unit, the occurrence of a predetermined event in the integrated circuit;

storing, in a data storage unit of the management unit, information regarding the determined event occurrence;

analysing the stored information and generating a signal to be output based on results of the analysis; and outputting via output interface of the management unit, the generated signal.

13. A method of managing the operating state of an integrated circuit comprising a management unit, the method comprising the steps of: determining, in the monitoring unit, the operating state of the integrated circuit; storing, in a data storage unit of the management unit, information regarding the determined operating state; analysing the stored information and generating a signal to be output based on results of the analysis; and outputting via output interface of the management unit, the generated signal, wherein determining the operating state of the integrated circuit comprises determining the occurrence of a predetermined event in the integrated circuit.

14. The method of claim 13, wherein the generated signal to be output comprises information relating to the determined operating state of the integrated circuit.

* * * * *